April 9, 1940. R. A. SHERMAN 2,196,905
METHOD OF TESTING FOR STEREOPSIS
Filed Dec. 4, 1935 2 Sheets-Sheet 1
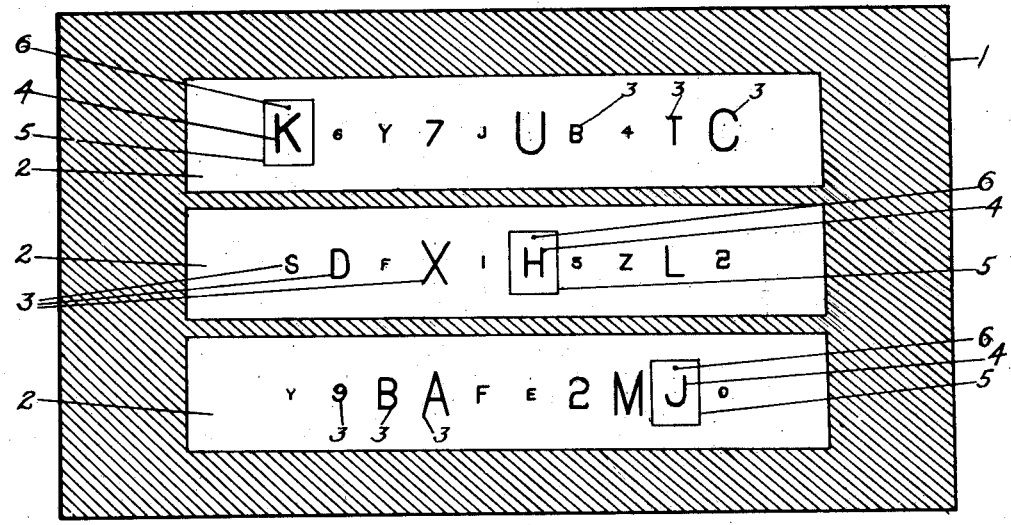
FIG-1
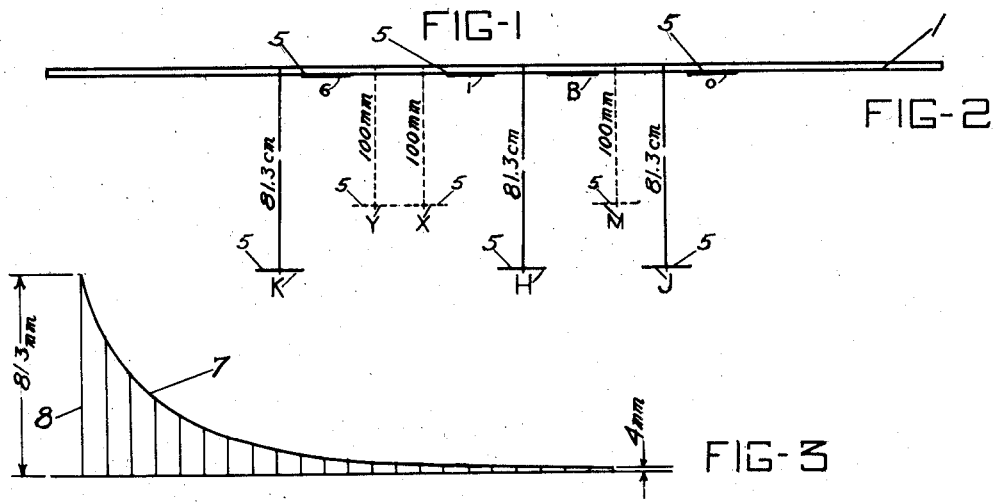
FIG-2
FIG-3
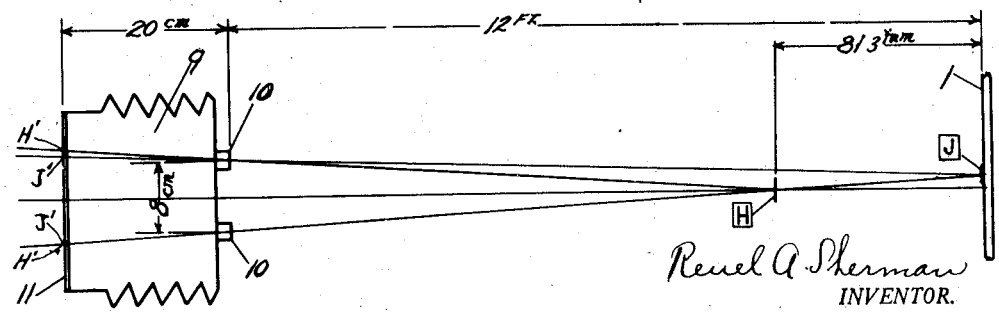
FIG-4
Reuel A. Sherman
INVENTOR.
BY
ATTORNEYS.

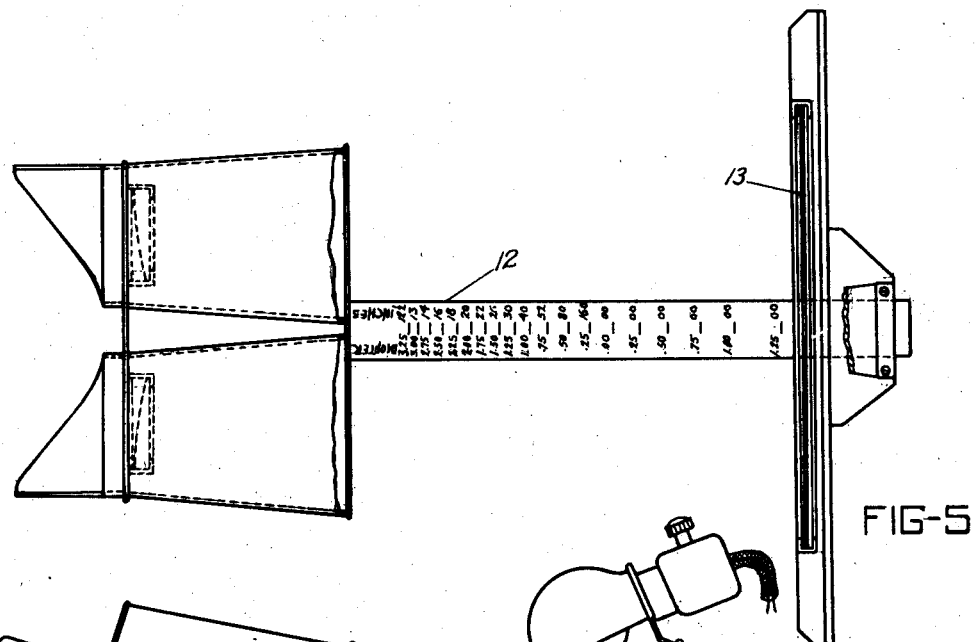

Patented Apr. 9, 1940

2,196,905

UNITED STATES PATENT OFFICE 2,196,905

METHOD OF TESTING FOR STEREOPSIS

Reuel A. Sherman, Meadville, Pa., assignor to Keystone View Company, Meadville, Pa., a corporation of Pennsylvania Application December 4, 1935, Serial No. 52,798

2 Claims. (Cl. 88—20)

The most common method of testing for depth perception or stereopsis has been that adopted by the U. S. Army in which two small pegs are slidingly mounted at a distance of about 20 feet from the person being tested, and the person being tested is provided with a cord connected with the pegs so as to move them toward and from him. The pegs are separated and the effort given to the person being tested is to manipulate the pegs through the cord toward or from him so as to bring the pegs at even distances from him. Such tests were made more necessary for the requirements of aviation, and there was established by the army a passing test of 30 millimeters of separation between the pegs, this having been determined after a large number of tests to be the average ability of aviators of known ability in flying. This difference represents an angular difference of 10 to 12 seconds of arc. Some individuals were found to be sensitive to differences as little as 3 seconds of arc.

The present invention was designed to simplify these tests and to provide a rating for the person being tested with relation to the known standard. In carrying out the invention a series of slides or stereopticon views are made, carrying targets arranged in pairs on the fields of the slides or views, one pair of targets being offset relatively to another pair or pairs of targets to correspond to the distances of those targets from the camera making the views. In making the views, therefore, so as to give a quantity rating, it is only necessary to have a series of views varying the distances toward and from the camera of pairs of targets, thus giving to the views the stereoptic distance effect incident to the variation in distances between the pairs of targets and the camera. The person being tested, as these views are presented to him, can, by identifying, or failing to identify the targets having the least image distance from him, fix his stereopsis rating, and this rating can be designated on the various views which are presented to him so that the test may be accurately carried out with very simple surroundings and convenient apparatus.

Features and details of the invention will appear from the specification and claims.

A preferred embodiment of the apparatus involved in the invention and with which the method may be practiced, is illustrated in the accompanying drawings as follows:

Fig. 1 shows an elevation of a screen having various targets arranged thereon in series some of which are advanced to a predetermined distance in front of the screen.

Fig. 2 shows a plan view of the same screen and targets.

Fig. 3 shows a diagram indicating the stereopsis curve.

Fig. 4 shows a diagram indicating the angular effects recorded on a stereoscopic camera by images or targets variously placed toward and from the camera, the angular relation and lens distances being exaggerated.

Fig. 5 shows a plan view of an ordinary stereoscope.

Fig. 6 shows a side elevation of the stereoscope.

Fig. 7 shows an elevation of one of the slides or stereopticon views, prepared in accordance with the invention.

1 marks a screen and 2 horizontally arranged white back-grounds ordinarily formed with white enamel finished paper. A series of targets 3 are placed on each of these back-grounds, the preferable symbols being letters and numerals. One target 4 of each series mounted on an individual paper card 5 is advanced forward from the screen a predetermined distance. This adjustment of the advanced target 4 is mounted on a wire 6 which extends directly forward from the screen so that the target may, by merely sliding it along on the wire, be adjusted to any definite predetermined distance from the screen. Different wires are provided for different targets for different slides. The targets 4 of each view or slide are arranged at the same distance from the screen.

With the targets so arranged, a photograph is made with the stereopticon camera 9, this camera being ordinarily set 12 feet from the screen. This is not a necessary distance but a convenient distance from which to scale differently ranged stereopsis conditions.

As noted in Fig. 4, a stereopticon camera 9 has the lenses 10. These lenses are usually adjustable, but the ordinary average separation is about 8 centimeters. A sensitive plate 11 in the illustration is placed 20 centimeters from the lenses.

Taking the target J on the screen as the full or zero distance of comparison, it will be noted that the offsetting of the two images J' on the plate will indicate an image distance of 12 feet from the camera. This off-setting of the images on the plate being the separation of these images in accordance with the angular lines from the image J to the image as carried through the lenses to the plate.

The targets H in Figs. 1 and 2, assumed to be the nearest to the person being tested of any setting which with the scale that has been adopted, is 813 mm., and the off-setting of the image H'—H' on the sensitive plate reflected from the target H and the offsetting, as will be observed in response to this larger angle, is indicated in the larger distance or offsetting of the images H' H'. The space between the upper image positions J' and H' (Fig. 4) indicates separation of the images. This offsetting is transferred from the plate to the slide or view 13 as it is printed from the plate. Thus, the person being tested, observing the view 13 through a stereoscope 12 is subjected to offset variations in the targets on the slides or views which correspond to angular variation to which he would be subjected viewing the actual images arranged on the screen, and with the point of view at the same position as that of the camera.

With this back-ground it has been possible to work out a series of arrangements of targets which will give quantity rating corresponding to ratings which may be accomplished with the peg test heretofore referred to. In developing this feature of the invention it was found that tests made with a great many individuals having definite ratings, as with the peg test, it was found that persons who were sensitive to 3 seconds of arc difference on the peg test could detect no smaller than 10.5 seconds of arc difference on the stereometric slides, and that those who detected 10.5 seconds of arc difference on the peg test were sensitive to only 19 seconds of arc difference on the stereometric slides. For this reason 19 seconds of arc difference was taken as the stereometric equivalent of 10.5 seconds on the pegs and was adopted as the practical starting point, or 100 percent rating. It is therefore possible to detect more than 100 percent stereopsis by this series.

With the curve of least differences established, which is similar to the curve of visual acuity accepted by those in this art as authoritative, the positioning of the targets for progressive ratings can be readily worked out. In Fig. 3 this curve is plotted at 7 showing the distance along the wires that the targets are placed for each rating view. The longest distance from the screen being 81.3 cm. and the least distance 4 millimeters. These ratings have been computed as follows, and the numbering of the views as ordinarily used is indicated by a number on the slide:

*Analysis of the stereometric unit*

| Slide No. | Per cent | Seconds of arc | Separation on plates, mm. | Distance of letters from screen, mm. |
|---|---|---|---|---|
| 1 | 1 | 1,300 | 1.00 | 813 |
| 2 | 5 | 870 | .67 | 560 |
| 3 | 10 | 600 | .46 | 406 |
| 4 | 15 | 440 | .34 | 305 |
| 5 | 20 | 350 | .28 | 254 |
| 6 | 25 | 286 | .22 | 203 |
| 7 | 30 | 210 | .16 | 152 |
| 8 | 35 | 175 | .135 | 127 |
| 9 | 40 | 140 | .103 | 100 |
| 10 | 45 | 115 | .09 | 82 |
| 11 | 50 | 95 | .075 | 67 |
| 12 | 55 | 80 | .062 | 56 |
| 13 | 60 | 75 | .059 | 50 |
| 14 | 65 | 65 | .05 | 45 |
| 15 | 70 | 55 | .04 | 38 |
| 16 | 75 | 45 | .035 | 32 |
| 17 | 80 | 39 | .03 | 26 |
| 18 | 85 | 32 | .025 | 21 |
| 19 | 90 | 26 | .02 | 16 |
| 20 | 95 | 21 | .015 | 13 |
| 21 | 100 | 19 | .0145 | 10 |
| 22 | 105 | 13 | .01 | 7 |
| 23 | 110 | 10 | .008 | 4 |

There is shown in Fig. 7 a slide or view 13 resulting from a target setting as indicated in Figs. 1 and 2. There is also shown in dash lines Fig. 2 a target setting for a slide #9, as indicating in the above list, which places the targets 100 millimeters from the screen. There is one slide for each rating and a setting of targets in making the slide corresponding to the target distances as indicated in the table.

Preferably the characters are of different sizes, ranging in height from ¼" to 1¼". The purpose of varying sizes of the letters on the targets is to prevent any possibility of assistance in identifying the position of the letters through differences in actual image sizes. Different slides also have different arrangements of characters; thus the slide having the targets as indicated in the dash lines might have characters substituted for the characters of U, T and R, and these could be of various sizes so that there would be no assistance to the person being tested in his response to the angular difference incident to an offsetting of the letters on the views. This invention, therefore, involves a very simple but accurate method of procuring the various photographic plates from which the views may be made. It avoids any complicated computations and assures absolute accuracy, assuming that the camera is accurate, and it also assures a correct rating of the person observing these views. It also provides these views which have the proper setting of the targets relatively to each other to accomplish an accurately measured rating for the person being tested. All that is necessary is to submit the views one after the other and without particular rotation, until the view involving the least distance difference of the targets can be recognized by the person. This gives him his rating.

With some persons their stereopsis sensitiveness differs with the position of the target up or down. For this reason the three series of targets are arranged horizontally, one above the other, so that the person being tested can be tested not only with relation to targets directly in front of his eyes but also as to targets having a slight inclination to the line of vision above and below the direct position.

What I claim as new is:

1. The method of making stereopticon views for testing stereopsis which consists in photographing stereoptically pairs of targets, placed at predetermined distances from the camera and each other, the images of the targets on the fields thereof, having a pre-established offset adapted to determine by observation in a stereoscope a degree of stereopsis capacity.

2. The method of making a series of stereopticon views for testing stereopsis, which consists in photographing stereoptically for each view pairs of targets placed at predetermined distances from the camera and each other, the images of the targets on the fields thereof having a pre-established offset adapted to determine by observation any degree of stereopsis capacity, the targets from which each view of the series is taken being differently spaced in predetermined relation to the spacing of the other views.

RECEL A. SHERMAN.